United States Patent [19]

Mihara et al.

[11] Patent Number: 5,764,470
[45] Date of Patent: Jun. 9, 1998

[54] RUSH CURRENT SUPPRESSION CIRCUIT

[75] Inventors: Kenjiro Mihara, Yokaichi; Hideaki Niimi, Hikone; Yuichi Takaoka, Shiga-ken, all of Japan

[73] Assignee: Murata Manufacturing Co., Ltd., Nagaokakyo, Japan

[21] Appl. No.: 759,179

[22] Filed: Dec. 4, 1996

[30] Foreign Application Priority Data

Dec. 5, 1995 [JP] Japan ................... 7-316721

[51] Int. Cl.$^6$ .................................. H02H 5/04
[52] U.S. Cl. .................. 361/106; 361/58; 361/111; 338/22 R
[58] Field of Search ............... 361/106, 58, 110, 361/111, 93–94; 337/23–24; 338/22 R, 20

[56] References Cited

U.S. PATENT DOCUMENTS

| | | | |
|---|---|---|---|
| 4,937,696 | 6/1990 | Yoshino et al. | 361/11 |
| 5,379,022 | 1/1995 | Bacon et al. | 338/20 |
| 5,596,308 | 1/1997 | Bock | 338/20 |

OTHER PUBLICATIONS

European Search Report, Dec. 3, 1997.
07045356, Tetsuo, Patent Abstracts of Japan, Feb. 14, 1995.
WO 94/00963, Penglase, PCT Document, Jan. 6, 1994.
Handbook of Modern Electronics and Electrical Engineering, Dec. 1981.

Primary Examiner—Brian K. Young
Assistant Examiner—Michael Sherry
Attorney, Agent, or Firm—Burns, Doane, Swecker & Mathis, LLP

[57] ABSTRACT

A rush current suppression circuit suppresses a peak value of a rush current flowing into a heater. The rush current suppression circuit includes a parallel circuit formed by a positive-characteristic thermistor and a negative-characteristic thermistor. The negative-characteristic thermistor has a resistance at a normal temperature higher than that of the positive-characteristics thermistor. The parallel circuit is connected in series to the heater.

13 Claims, 2 Drawing Sheets

RUSH CURRENT SUPPRESSION CIRCUIT

BACKGROUND OF THE INVENTION

1. Field of the Invention

The present invention relates to a rush current suppression circuit for suppressing a rush current (e.g. a surge current) generated when power is supplied to an apparatus which includes a heater. More particularly, the invention relates to a rush current suppression circuit for use in image forming apparatuses, cooking apparatuses, and the like, which employ heating devices.

2. Description of the Related Art

Image fixing units of copiers, printers and like devices commonly employ halogen heaters. High power is often supplied to these halogen heaters. As a result, a high rush current (e.g. a surge current) flows through the circuitry including the halogen heater immediately after power is supplied to the heater. This high rush current reduces the life of the power supply switch and the heater driving circuit used in the copier or printer. This high rush current also causes a voltage drop in the power supply which, in turn, leads to problems. For example, the voltage drop can lead to a reduction in the output of peripheral electronic devices.

One conventional solution to this problem is to use a triac to suppress a rush current supplied to the heater. Specifically, a phase angle control circuit is provided to gradually increase the phase angle of a gate signal supplied to the triac, thereby suppressing the rush current when power is first applied.

Another conventional solution uses a circuit as shown in FIG. 3. The circuit includes a negative-characteristic thermistor device 1 having negative temperature-resistance characteristics. That is, as temperature increases, the resistance of this thermistor decreases. This thermistor device 1 is connected in series to a heater 2 to suppress rush current supplied thereto. This circuit suppresses a high rush current supplied to the heater 2 by applying a large load to the negative-characteristic thermistor 1, which has high resistance when first energized. The reference number 3 represents an AC power supply.

However, the above-described methods of suppressing rush current supplied to the heater suffer a number of drawbacks, as described below.

The first example, in which the phase angle of a gate signal output to a triac is gradually increased, provides sufficient suppression of rush current. However, it requires a control circuit in addition to the suppression device, and is therefore costly. Further, the phase angle control circuit produces a noise signal having a high frequency output which can adversely affect other control circuits and components of the apparatus, and may cause their malfunction.

The second example uses a negative-characteristic thermistor 1 connected to the heater 2 in series without any special control circuit, and therefore is less expensive than the first example. However, the negative-characteristic thermistor 1 produces its own heat when the power supply is turned on, which reduces its resistance from an initial value at a normal temperature. As referenced herein, the term "normal temperature" refers to an ambient temperature in a vicinity of the circuit (for example, the temperature of the thermistor prior to application of power thereto). As such, although this solution suppresses very large rush currents immediately after the power supply is turned on, it can not effectively suppress rush currents which occur in a later period of time after the initial rush current has been attenuated to a rated current of the apparatus.

It is therefore an exemplary object of the present invention to solve the above-described problems by providing a rush current suppression circuit which uniformly suppresses a peak value of a rush current flowing into a heater over a long time period.

SUMMARY OF THE INVENTION

In order to achieve the above-stated object, as well as other objects, the present invention provides a current suppression circuit having a parallel circuit including a positive-characteristic thermistor and a negative-characteristic thermistor. The negative-characteristic thermistor has a higher resistance at a normal temperature than the positive-characteristic thermistor. The parallel circuit is connected in series to a circuit having a heater.

As a result of the above configuration, when the power supply is turned on, current flows through the positive-characteristic thermistor, which has resistance lower than that of the negative-characteristic thermistor at the normal temperature, to suppress the rush current. When the current flowing through the positive-characteristic thermistor increases, the resistance of the positive-characteristic thermistor increases beyond the resistance of the negative-characteristic thermistor at the normal temperature. As a result, a current starts flowing through the negative-characteristic thermistor, allowing the rush current supplied to the heater to be suppressed.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION OF PREFERRED EMBODIMENT

An exemplary embodiment of the present invention will now be described in detail with reference to FIG. 1.

Figure 1:
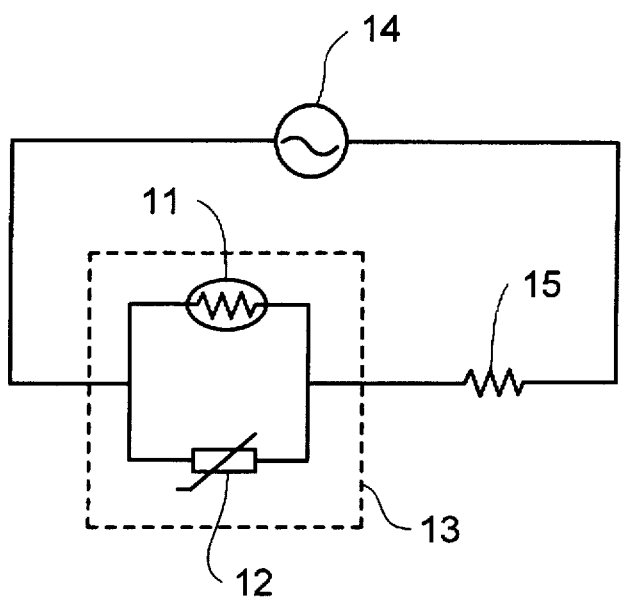
FIG. 1 is an exemplary circuit diagram showing a rush current suppression circuit according to an embodiment of the present invention.

In the rush current suppression circuit of FIG. 1, a parallel circuit 13 is formed by connecting first and second variable resistance elements, such as a positive-characteristic thermistor 11 and a negative-characteristic thermistor 12, in parallel. This parallel circuit 13 is connected in series with a heater 15 (such as a halogen heater). The heater 15 and the parallel circuit 13, in turn, are connected to an AC power supply 14 to form a circuit having a heater.

Assume that $R1_0$ represents the resistance R1 of the positive-characteristic thermistor 11 at a first time (e.g., a time corresponding to the positive-characteristic thermistor 11 being at a normal temperature $T_0$.) and that $R2_0$ represents the resistance R2 of the negative-characteristic thermistor 12 at the normal temperature $T_0$. Then, the positive-characteristic thermistor 11 and the negative-characteristic thermistor 12 are chosen so that the resistance at the normal temperature of each of the thermistors satisfies a relationship expressed by $R1_0 < R2_0$.

A description will now follow regarding the operation of the circuit of FIG. 1.

Before the power supply is turned on, the halogen heater 15 (including, for example, a halogen lamp) has very low resistance. Therefore, when the power supply is turned on, a large voltage load is applied to the parallel circuit 13 connected in series to the halogen heater 15. Since the combination of the resistance R1 and R2 at the normal temperature in the parallel circuit 13 satisfies the relationship R1<R2, the rush current initially flows substantially through the positive-characteristic thermistor 11, which has the lower resistance R1 at the normal temperature. The thermistor 11 having the resistance R1 at the normal temperature suppresses the rush current. When heat generated in the positive-characteristic thermistor 11 eventually increases the resistance of the thermistor 11 beyond the resistance R2 at the normal temperature of the negative-characteristic thermistor 12 (e.g. raises the temperature to $T_1$, where $T_1 > T_0$), the current flows substantially through the negative-characteristic thermistor 12. As a result, the rush current is suppressed by the negative-characteristic thermistor 12 in a period in which the current is decreased nearly to a rated current of the rush current suppression circuit. Thereafter, the negative-characteristic thermistor 12 serves as a path that allows a rated current required for the halogen heater 15 to pass therethrough because its resistance is decreased by its own generated heat.

Figure 2:
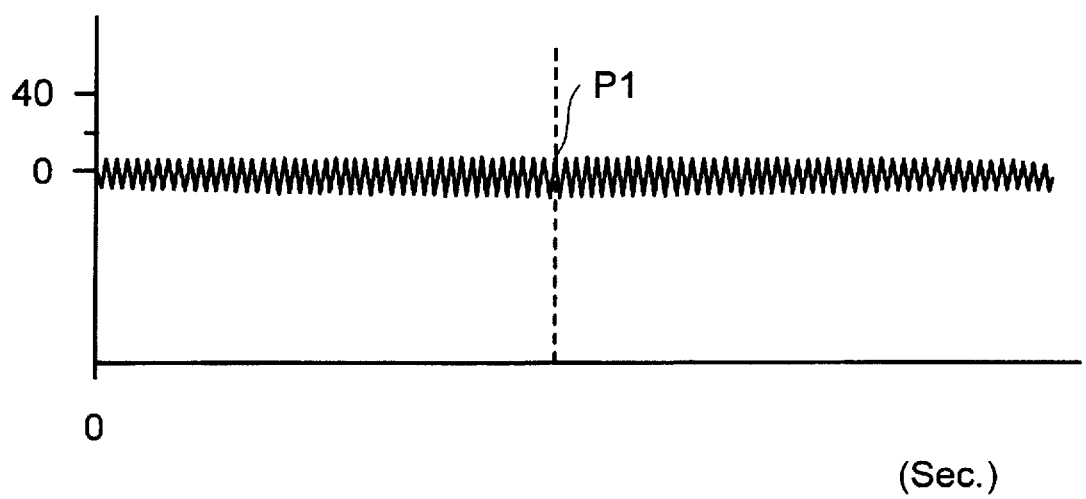
FIG. 2 is an exemplary waveform characteristic of a rush current in the rush current suppression circuit shown in FIG. 1.

According to one exemplary embodiment, the rush current suppression circuit shown in FIG. 1 can be configured using a positive-characteristics thermistor 11 having a resistance of approximately 6 Ω at the normal temperature, a negative-characteristic thermistor 12 having a resistance of approximately 15 Ω at the normal temperature, a halogen heater 15 having a resistance of approximately 1 Ω, and an AC power supply 14 of approximately 100V and 60 Hz. FIG. 2 shows a waveform characteristic of the rush current in the circuit shown in FIG. 1, with the above-described exemplary component values.

Figure 3:
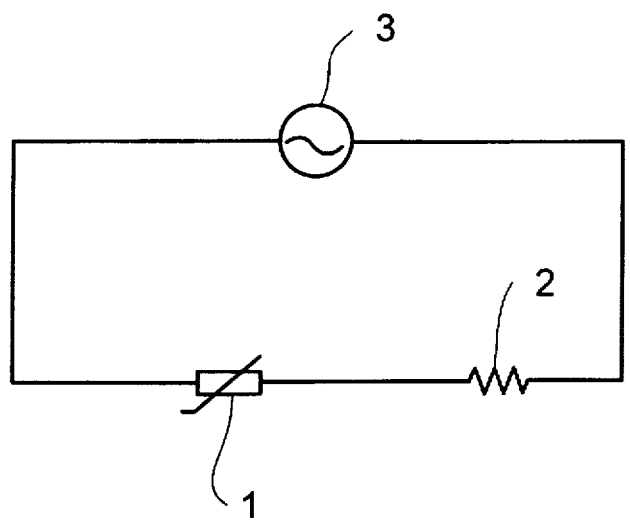
FIG. 3 is a circuit diagram showing a rush current suppression circuit according to the prior art.
Figure 4:
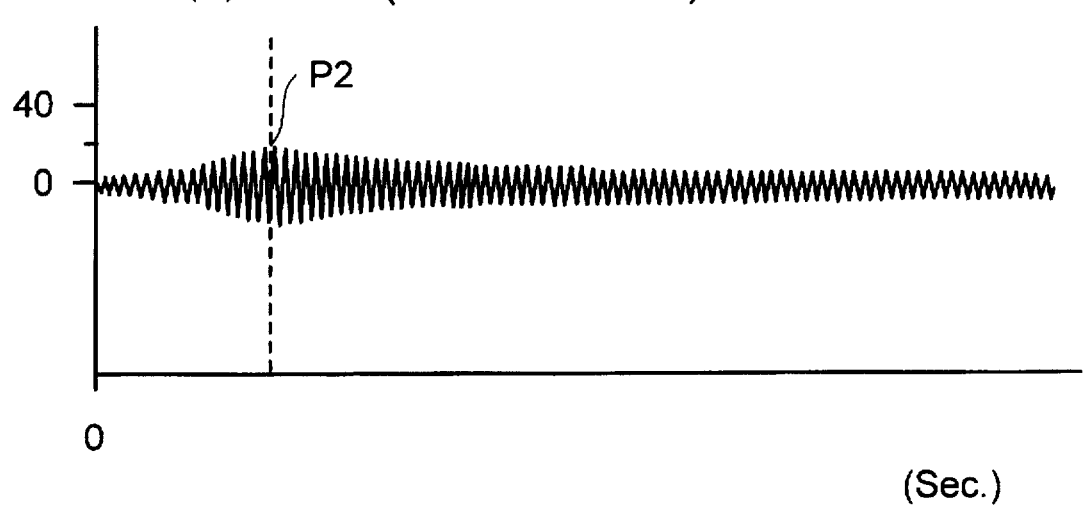
FIG. 4 is a waveform characteristic of a rush current in the rush current suppression circuit shown in FIG. 3.

Consider, in contrast, the rush current suppression circuit according to the prior art circuit shown in FIG. 3. In this circuit, assume that the negative-characteristic thermistor 1 has a resistance of approximately 15 Ω at the normal temperature, the halogen heater 2 has a resistance of approximately 1 Ω, and the AC power supply 3 is approximately 100V and 60 Hz. FIG. 4 shows a waveform of the rush current characteristics of this circuit.

A comparison of FIGS. 2 and 4 shows the advantages of the circuit shown in FIG. 1 over the circuit shown in FIG. 3. As shown in FIG. 2, an exemplary peak value P1 of the rush current is approximately 10.5 amps, which occurs approximately 0.73 seconds after the power supply is turned on. Further, it is possible to smoothly suppress the rush current to a substantially constant rated current value (e.g. 10 amps) over a relatively long period after the application of power to the circuit.

On the other hand, as shown in FIG. 4, with the rush current suppression circuit according to the prior art shown in FIG. 3, a peak value P2 of a rush current reaches approximately 20 amps approximately 0.29 seconds after the power supply is turned on. This rush current is suppressed to approximately 10 amps approximately 0.8 seconds after the power supply is turned on. However, it is not possible to suppress the rush current substantially uniformly over a long period following the application of power to the circuit.

As described above, a rush current suppression circuit according to the present invention advantageously suppresses rush current uniformly over a long period following the application of power thereto. Further, the rush current suppression circuit according to the present invention suppresses rush current in a period in which the rush current is attenuated to a rated current of the apparatus. The suppression circuit can be used in an apparatus including a heater serving as a heat source.

While particular embodiments of the present invention has been shown and described, it will be apparent to those skilled in the art that various changes and modifications may be made without departing from this invention. The appended claims encompass any such changes and modifications as fall within the true spirit and scope of this invention.

What is claim is:

1. A heater circuit including a heater and a rush current suppression circuit for suppressing rush current supplied to a said heater, said rush current suppression circuit comprising:

a parallel circuit connected in series with said heater including a positive-characteristic thermistor and a negative-characteristic thermistor, wherein said negative-characteristic thermistor has a resistance at an initial temperature higher than a resistance of said positive-characteristic thermistor at said initial temperature.

2. The heater circuit of claim 1, wherein said parallel circuit diminishes current surges by spreading a current surge with respect to time, so that a peak magnitude of said current surge is reduced.

3. A heater circuit including a heater and a rush current suppression circuit connected in series with said heater for suppressing rush current, said rush current suppression circuit comprising:

a first variable resistance current suppression element having a resistance R1 at a temperature $T_0$ of $R1_0$; and a second variable resistance current suppression element having a resistance R2 at the temperature $T_0$ of $R2_0$;

wherein said first variable resistance element is connected in parallel with said second variable resistance element, and wherein $R1_0$ is less than $R2_0$;

wherein said first and second variable resistance elements comprise first and second thermistor devices, respectively.

4. The heater circuit of claim 3, wherein R1 remains less than R2 for at least a first period of time following initial application of power to said rush current suppression circuit.

5. The heater circuit of claim 4, wherein more current passes through said first variable resistance element than said second variable resistance element at said temperature $T_0$.

6. The heater circuit of claim 5, wherein more current passes through said second variable resistance element than said first variable resistance element at a temperature $T_1$, wherein the temperature $T_1$ is greater than the temperature $T_0$.

7. The heater circuit of claim 3, wherein said first thermistor device has a resistance characteristic which increases as temperature increases, and said second thermistor device has a resistance which decreases as temperature increases.

8. The heater circuit of claim 3, wherein said circuit diminishes current surges by spreading a current surge with respect to time, so that a peak magnitude of said current surge is reduced.

9. A heater circuit, including:

a power source for supplying power to said circuit;

a heater connected to said power source; and a parallel circuit connected in series with said heater, said parallel circuit including:

a positive-characteristic thermistor; and a negative-characteristic thermistor connected in parallel with said positive-characteristic thermistor.

10. The heater circuit of claim 9, wherein said parallel circuit diminishes current surges by spreading a current surge with respect to time, so that a peak magnitude of said current surge is reduced.

11. The heater circuit of claim 9, wherein said heater circuit is for use in an image forming apparatus.

12. The heater circuit of claim 9, wherein said heater comprises a halogen heater.

13. The heater circuit of claim 9, wherein said positive-characteristic thermistor has a resistance of approximately 6 $\Omega$ at a normal temperature $T_0$, and said negative-characteristic thermistor has a resistance of approximately 15 $\Omega$ at the normal temperature.

* * * * *